(12) United States Patent
Finis et al.

(10) Patent No.: US 10,769,124 B2
(45) Date of Patent: Sep. 8, 2020

(54) LABELING VERSIONED HIERARCHICAL DATA

(71) Applicant: SAP SE, Walldorf (DE)

(72) Inventors: Jan Finis, Munich (DE); Robert Brunel, Heidelberg (DE)

(73) Assignee: SAP SE, Walldorf (DE)

( * ) Notice: Subject to any disclaimer, the term of this patent is extended or adjusted under 35 U.S.C. 154(b) by 1083 days.

(21) Appl. No.: 14/840,985

(22) Filed: Aug. 31, 2015

(65) Prior Publication Data

US 2015/0370836 A1 Dec. 24, 2015

Related U.S. Application Data

(63) Continuation of application No. 13/932,514, filed on Jul. 1, 2013.

(60) Provisional application No. 61/725,783, filed on Nov. 13, 2012.

(51) Int. Cl.
*G06F 7/00* (2006.01)
*G06F 16/21* (2019.01)
*G06F 16/00* (2019.01)
*G06F 16/28* (2019.01)
*G06F 16/22* (2019.01)
*G06F 16/23* (2019.01)

(52) U.S. Cl.
CPC .......... *G06F 16/219* (2019.01); *G06F 16/00* (2019.01); *G06F 16/2246* (2019.01); *G06F 16/2329* (2019.01); *G06F 16/282* (2019.01)

(58) Field of Classification Search
CPC .............. G06F 17/00; G06F 16/219
USPC ........................................................ 707/736
See application file for complete search history.

(56) References Cited

U.S. PATENT DOCUMENTS

| | | | |
|---|---|---|---|
| 10,616,604 B2* | 4/2020 | Zhang | H04N 19/61 |
| 2008/0152235 A1* | 6/2008 | Bashyam | H04N 19/99 |
| | | | 382/224 |
| 2013/0054495 A1* | 2/2013 | Hawkins | G06F 9/3867 |
| | | | 706/12 |
| 2013/0091168 A1* | 4/2013 | Bhave | G06F 16/2477 |
| | | | 707/771 |

OTHER PUBLICATIONS

Marian, Amelie et al., "Change-Centric Management of Versions in an XML Warehouse", Proceedings of the 27th VLDB Conference, Rome, Italy, 2001, 10 pp.

Boncz, Peter et al., Updating the Pre-Post Plane in MonetDB/XQuery, Proceedings of the Second International Workshop on XQuery Implementation, Experience and Perspectives, Jun. 16-17, Baltimore, Maryland, 2005, 6 pp.

Extended European Search Report for EP Application No. 13192536.4, dated Jan. 20, 2017, 10 pp.

* cited by examiner

*Primary Examiner* — Eliyah S. Harper
(74) *Attorney, Agent, or Firm* — Buckley, Maschoff & Talwalkar LLC

(57) ABSTRACT

A system includes determination of a first interval encoding of a first version of a hierarchy of nodes, determination of a second version of the hierarchy of nodes, determination of a first difference between the first version of the hierarchy of nodes and the second version of the hierarchy of nodes, and determination of a first swap of two translation ranges of the first interval encoding, the first swap representing the first difference.

12 Claims, 13 Drawing Sheets

LABELING VERSIONED HIERARCHICAL DATA

CROSS REFERENCE TO RELATED APPLICATIONS

This application is related to, and claims benefit to and priority of, U.S. Patent Application Ser. No. 61/725,783, filed on Nov. 13, 2012, and U.S. patent application Ser. No. 13/932,514, filed on Jul. 1, 2013, the contents of which are hereby incorporated by reference in their entirety for all purposes.

BACKGROUND

Many business operations feature hierarchical data. For example, business users need to manage human resource (HR) hierarchies, which model the relationship between employees. Most relational database systems do not provide efficient support for hierarchical data. Efficient query support of database hierarchies and of prior database states requires new techniques for maintaining and versioning such hierarchical data.

DESCRIPTION

The following description is provided to enable any person in the art to make and use the described embodiments. Various modifications, however, will remain readily apparent to those in the art.

Figure 1:
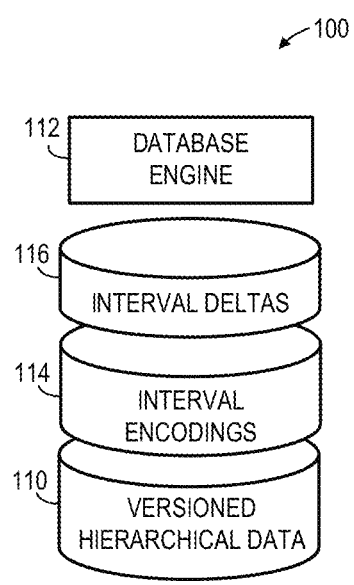
FIG. 1 is a block diagram of a computing system according to some embodiments.

FIG. 1 is a block diagram of database 100 according to some embodiments. FIG. 1 represents a logical architecture for describing systems according to some embodiments, and actual implementations may include more or different components arranged in other manners.

Database 100 may comprise any query-responsive data source or sources that are or become known, including but not limited to a structured-query language (SQL) relational database management system. Database 100 may comprise a relational database, a multi-dimensional database, an eXtendable Markup Language (XML) document, or any other data storage system storing structured and/or unstructured data. The data of database 100 may be distributed among several relational databases, multi-dimensional databases, and/or other data sources. Embodiments are not limited to any number or types of data sources. For example, database 100 may comprise one or more OnLine Analytical Processing (OLAP) databases (i.e., cubes), spreadsheets, text documents, presentations, etc.

Database 100 may implement an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Alternatively, volatile storage may be used as cache memory for storing recently-used data, while persistent storage stores the full database. In some embodiments, the data of database 100 comprises one or more of conventional tabular data, row-based data stored in row format, column-based data stored in columnar format, and object-based data. Database 100 may also or alternatively support multi-tenancy by providing multiple logical database systems which are programmatically isolated from one another. Moreover, the data of database 100 may be indexed and/or selectively replicated in an index to allow fast searching and retrieval thereof.

Database 100 may store metadata describing regarding the structure, relationships and meaning of the data stored within database 100. This information may include data defining the schema of database tables stored within database 100. A database table schema may specify the name of the database table, columns of the database table, the data type associated with each column, and other information associated with the database table.

Database 100 includes, among other data, versioned hierarchical data 110. Conserving database versions allows the execution of queries not only on the latest state of the database but also on older states. If the HR hierarchy of a large company is to be versioned on a daily basis for several years, the result is a versioned hierarchy with millions of nodes and thousands of versions. Other applications may require even finer-grained version control, potentially resulting in millions of versions.

Database engine 112 performs administrative and management functions for database 100. Such functions may include snapshot and backup management, indexing, optimization, garbage collection, and/or any other database functions that are or become known. For example, database engine 112 may operate as described herein to generate interval encodings 114 and interval deltas 116.

Figure 2:
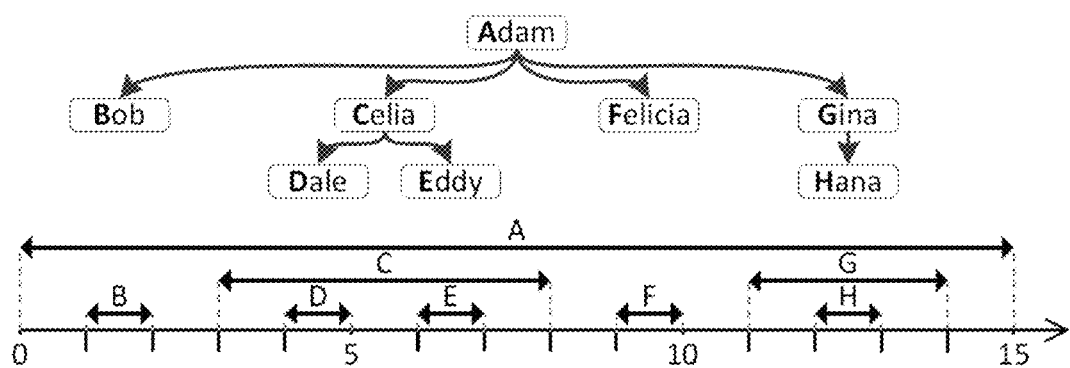
FIG. 2 illustrates a human resources hierarchy and its interval encoding according to some embodiments.

Interval encodings 114 are used for indexing hierarchical data 110. For example, each node of a hierarchy is assigned a constant number of labels and certain queries can be answered by only considering the node labels. A prominent known labeling scheme is the nested intervals (NI) labeling scheme, in which each node is labeled with an interval [low, high] and the interval for a node v is a proper subinterval of interval of the parent node of v. FIG. 2 illustrates an example HR hierarchy and its corresponding interval encoding.

The below-described DeltaNI index applies a nested intervals (NI) scheme to versioned hierarchies. Some embodiments of the index are efficient in space and time by representing only a base version as a fully materialized NI encoding; other versions are represented by deltas (e.g., interval deltas 116) which transform the interval bounds between different versions. By grouping the deltas in an exponential fashion, some embodiments allow executing queries in each version of a history of n versions while applying at most log n deltas. Many update operations, including but not limited to moving or deleting whole ranges of nodes, can be reduced to a simple swap operation in the NI encoding. As many query processing techniques that work on top of NI labeling (as, e.g., the staircase join) have already been proposed, the DeltaNI index can be used as a building block for processing various kinds of queries.

For purposes of the present description, a hierarchy is defined as an ordered, rooted forest T=(V,E), which is a directed graph consisting of a set of nodes (vertices) V and an edge relation E⊆V×V. The graph is free of circles and the edge relation is injective. d denotes the maximum depth of a hierarchy, i.e., the longest path from any node to its root, and n+|V| denotes the number of nodes in a tree. Applications can also limit a hierarchy to be a tree instead of a forest (i.e., only one root exists) or may specify that the order among siblings is not important and thus is not made visible to the user. Each vertex may contain a fixed number of attributes while edges may not carry attributes in some embodiments.

A straightforward representation for hierarchies in relational databases is to save the key of the parent node of each node in a parent column. The tree root has NULL as parent. Such encoding may yield rather bad performance for queries that rely on the recursive structure of a hierarchies, like whether node X is an ancestor of node Y. This query would require a backward search from Y which is naïvely implemented as a recursive self-join resulting in n self-joins over the parent column, where n is the length of the path from Y to the root.

In order to speed up queries which work on recursive properties of the hierarchy the parent column is dropped and instead the hierarchy is represented by a relation, in which each row represents one node storing its attributes, and an index (i.e., the DeltaNI index described herein) which encodes the structure of the hierarchy.

As previously mentioned, the index may be built upon the NI labeling scheme (also referred to as interval encoding, NI encoding, or range-based encoding). Here, each node is represented by the integer interval [low, high] (also referred to as [left, right] or [begin,end]). The encoding can be obtained by a depth-first traversal. Whenever a node is visited first, before its children are visited (pre-order) its low bound is assigned from a counter variable which starts at zero and is incremented whenever a bound is assigned. After the low bound has been assigned and the child nodes are visited, the high bound is assigned from the counter variable (post-order). If a node $v_2$ is a descendant of another node $v_1$ its [low,high] interval is a proper sub-interval of $v_1$'s interval. Formally, an ancestor query "is $v_1$ ancestor of $v_2$" can be answered positively, iff $n_1.low<n_2.low$ and $n_1.high>n_2.high$. Similarly, a preceding query "is $n_1$ a preceding node of $n_2$" is answered positively, iff the interval of $n_1$ ends before the interval of $n_2$ starts, i.e., $n_1.high<n_2.low$. Because these queries require at most two integer comparisons, their time complexity is O(1), which may result in a large performance gain compared to repetitive self-joining.

Hierarchy Queries and Updates

An index according to some embodiments may yield a fully-featured NI encoding for each version of the hierarchy. Consequently, all kinds of queries which a usual NI encoding can answer for a non-versioned hierarchy can be efficiently also answered for versioned hierarchies using a DeltaNI index described herein. For example, the DeltaNI index can be used as a basis for the staircase join, the Stack-Tree join, or the TwigStack join in order to answer XPath-style queries.

FIG. 2 illustrates a human resources hierarchy to provide an example of a query which can be executed directly on an DeltaNI index. The query requests the size of the subtree rooted at a node v, which is executed by calculating (v.high−v.low−1)/2. With respect to FIG. 2, a subtree query may be: "How many employees are (transitively) supervised by Adam (node A)". Using the interval encoding, the answer is (15−0−1)/2=7. The index may also be used by a database system to answer a wide range of other complex queries efficiently. In the versioned case, the query would be extended to work on a certain version, e.g., "How many employees are (transitively) supervised by Adam in Version $V_x$".

Updating a hierarchy consists of adding, removing, or moving nodes in the hierarchy. Altering the attributes of the nodes is not discussed below since the attributes are stored in usual relations and thus need no extra handling. The following update operations may be supported in some embodiments:

insertBefore(b): Inserts a new node before bound b.

moveSiblingRangeBefore(v,v',b): v is a left sibling of v' or v=v'. The operations moves all siblings between v and v' (inclusively) and their descendants before bound b.

deleteSiblingRange(v,v'): v is a left sibling of v' or v=v'. The operations deletes all siblings between v and v' (inclusively) and their descendants.

The above-defined set of update operations is powerful, as the operations allow not only single node insertion and deletion but also subtree deletion and the moving of nodes, subtrees, and even whole ranges of siblings. These operations may be important in many use cases: For example, a division in a human resources hierarchy receiving a new head can be modeled by simply moving all nodes in that division below the new head with a single operation. With insert and delete operations only, this would result in one delete and one insert per person in this division. As most hierarchies are rather flat but have a large fan-out, this would result in a high update cost and the resulting delta would contain many operations also yielding increased space consumption. Consequently, the above update operations are useful in a wide applicability of a hierarchy index. An index according to some embodiments supports all these updates in worst case logarithmic time.

Versioned Hierarchies

A version history $V_0, V_1, \ldots, V_n$ of a hierarchy depicts certain states of that hierarchy and allows queries in each version. Updates are allowed in the latest version. A new branch of version histories can be created based on any existing version. With the existence of multiple branches, updates can be performed on the latest version of each branch. Although branching is supported by the index, a linear version history will be assumed herein for brevity. Supporting branching is straightforward without any adjustments to the index being necessary. Some applications might create a new version with each new change while others might create new versions on a regular basis (e.g., every day).

Although versioning of the hierarchy structure is considered herein, other versioning considerations, like the versioning of changing node attributes, can be achieved by traditional techniques for versioning (or transaction-time) relational databases, as these attributes are stored in a usual relational table.

Use Cases for DeltaNI

One use case for the index according to some embodiments is the version control of hierarchical data. Another possible use case includes transaction-time temporal hierarchies. The index (as any other version control approach) can be directly used for this purpose. An additional lookup data structure (for example, a search tree) which maps time intervals to versions is maintained, allowing to find the version that corresponds to a certain timestamp. The maintenance of such a data structure is straightforward and is therefore not covered here. Instead of working with XML, we assume general hierarchies that subsume XML. Thus, the index can also be used for the management of versioned XML data.

The NI encoding is by default not dynamic (i.e., not efficiently updatable), since an update needs to update $O(n)$ bounds on average. In contrast, the DeltaNI index may be used as an efficiently-updatable NI labeling scheme for non-versioned databases. Since a delta can be updated efficiently, using a single delta for representing all incoming updates is sufficient for making an NI encoding dynamic. Finally, the deltas in this approach can also be used for logging purposes, as a delta accurately describes a set of changes.

Efficiently storing the version history of a hierarchy may consist of saving one or more base versions explicitly using interval encoding and saving all other versions as interval deltas only. This may allow for space-efficient compression of the version history while still allowing efficient queries.

An interval delta $\delta: N \to N$ is defined as a function mapping interval bounds from a source version V to a target version V'. When needed, the source and target versions of a delta are explicitly specified using the notation $\delta_{V \to V'}$. Given an interval bound b of a node in V, $\delta_{V \to V'}$ (b) yields the corresponding bound in V'. The inverse function $\delta_{V \to V'}^{-1} = \delta_{V' \to V}$ can be used for mapping back from bounds in the target version to bounds in the source version. We denote the interval encoding of the source version as source space and the one of the target version as target space. Thus, $\delta$ is a function mapping from the source to the target space.

The full interval encoding of the target version can be obtained by applying $\delta$ to all interval bounds of the source version. However, the delta can also be used to answer certain queries without computing the target version intervals completely. For example, consider two nodes v and v' with known interval bounds in the source version V. Interval encoding allows a test of whether v' is a descendant of v in version V by applying the condition v.low<v'.low ∧ v.high>v'.high. Using the interval delta $\delta$ from V to V', the same query can be answered in the target version by applying the condition $\delta$(v.low)<$\delta$(v' low) ∧ $\delta$(v.high)>$\delta$ (v'.high). Thus, if we have a base version V with known interval bounds and a version delta $\delta_{V \to V'}$, we can answer queries in V' as well. To save a version history thoroughly, it suffices to save one base version (e.g., the first version) and then save only deltas from the base version to each other version.

When using interval deltas to represent the version history of a hierarchy, not all nodes may have existed in the base version V. Instead, they may have been added in a later version. These nodes do not have any bounds in the base version, thus computing their bounds in other versions V' using $\delta_{V \to V'}$ is impossible. In addition, there might be nodes which were deleted in intermediate versions. It is unclear what the result of $\delta_{V \to V'}$ (b) should be if b belongs to a node which was deleted in a version between V and V'. To handle insertions and deletions consistently, we make the following enhancements, which we call active region approach: For each version V of the history, the maximum bound value in that version, denoted as max(V), is stored. By definition, any bound value greater than max(V) does not exist in version V (i.e., "is not active"). In addition, for every base version V, we define |V| as the number of bounds stored in V also including bounds which do not exist in that version, that is, bounds which are greater than max(V). These enhancements allow us to model bounds that do not exist in a version. Consider a base version V and a version V' which adds a new node v with bounds [v.low,v.high]. This node insertion is modeled by adding the two bounds $b_1$=|V| and $b_2$=|V|+1 into the base version V (which also increments |V| by two) but without increasing max(V), because $b_1$ and $b_2$ do not exist in V. To yield the correct result in V', the delta is defined correspondingly: $\delta_{V \to V'}(b_1)$=v.low and $\delta_{V \to V'}(b_2)$=v.high. Then, max(V') is incremented by two because this version now contains two more bounds. A node deletion in a version V' can simply be achieved by moving the bounds of the node to be deleted past max(V'). We define the interval (max(V), ∞) as the inactive region and the interval [0, max(V)] as the active region of version V. Bounds in the active region represent bounds that exist in V and bounds in the inactive region represent bounds of nodes that do not exist in V. We call bounds in the active region active bounds and bounds in the inactive region virtual bounds, because they do not exist, actually. When using the active region approach, the test whether a node v exists in a version V to which a delta $\delta$ exists can be implemented by checking whether the lower bound of v (and thus also the upper bound) is active, i.e., $\delta$(v.low)≤max(V).

Each node is uniquely identified by its bounds in the base version, since these bounds will never be updated. Thus, the bounds pose a durable numbering for the nodes in a versioned hierarchy. Given a bound b in a version V', one can obtain the node to which b belongs by applying reverse deltas to b transforming the bound back to the base version and looking up the corresponding node there.

Interval deltas, together with the active region approach, can be used to model the version history of a hierarchy. We present an efficient representation of the interval delta function $\delta$ together with algorithms for building such delta from two explicitly represented versions or from a base version and a sequence of update operations on that version. We also introduce a technique for reducing the size of all deltas which need to be stored to represent a large version history with thousands or even millions of versions compactly.

To render the interval delta approach feasible, the resulting delta representation should be efficient in space and time. A reasonable space complexity requirement for a delta $\delta$ is $O(c)$, where c is the number of atomic changes like node insertion, node deletion, or subtree relocation which led from the source to the target version. In the worst case, this is also the best possible bound, because each change must be represented somehow requiring at least a constant amount of space. A reasonable upper bound for the time complexity of $\delta$, i.e., the time it takes to compute $\delta$(b) for any interval bound b in the source version, is $O(\log(c))$. Any higher non-logarithmic bound would make the approach infeasible for deltas containing a large amount of changes. Our approach satisfies both mentioned complexity bounds. The space and time complexity of our $\delta$ representation grows only with respect to the number of changes between the source and the target version. Especially, the complexities do not grow with the number of nodes or edges in the source or target version.

A first nave delta representation would be to save all bounds which have changed between V and V'. However, a node insertion changes an average of n/2 bounds yielding $O(n)$ space complexity. Obviously, this violates the required space complexity bound. Such space complexity is even equal to saving the interval encoding of the target version thoroughly.

Figure 3:
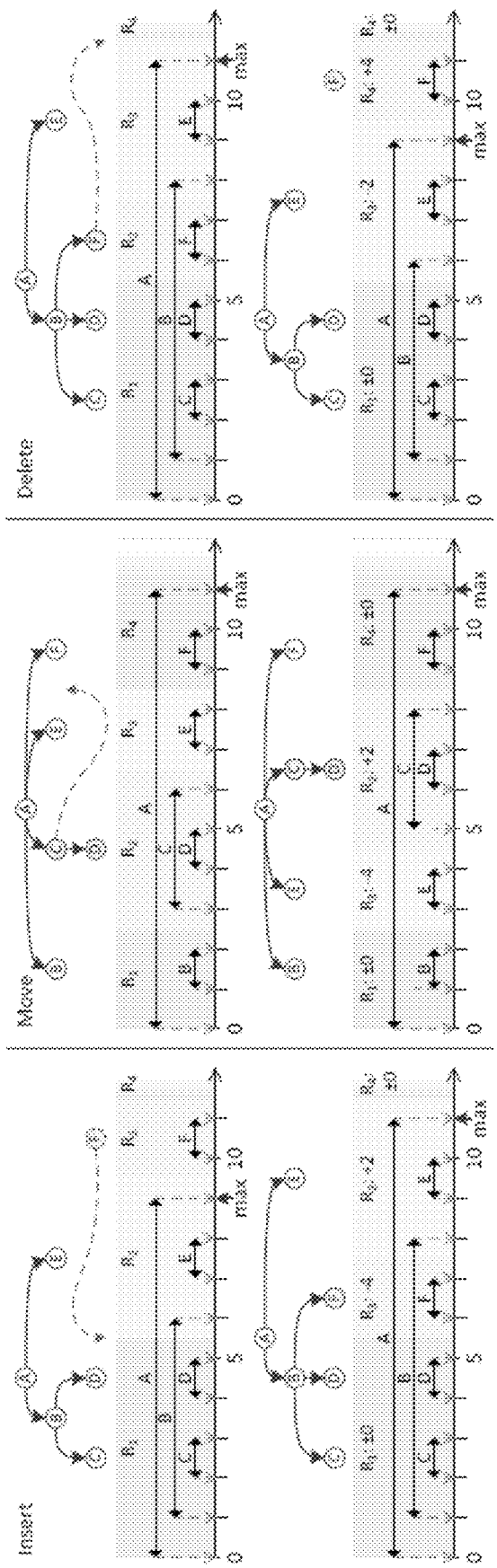
FIG. 3 illustrates changes to a hierarchy and resulting changes to its interval encoding according to some embodiments.

Our technique for delta storage leverages the fact that each change introduces only a constant number of shifts (translations) of ranges of interval bounds. The key observation is that each atomic update of a tree (node insertion, node deletion, subtree relocation, subtree deletion) can be modeled in the interval bound space by a swap of two ranges of interval bounds, followed by an update of the max value in case of insertion or deletion to adjust the size of the active region. FIG. 3 depicts the implementation of the operations using the swapping of two ranges. Subtree deletion is omitted as it is conceptually equal to node deletion. The middle of the figure shows the relocation of the subtree rooted at node C to the right of node E. The hierarchy is shown on the top and its interval encoding is displayed beneath. The relocation is simply accomplished by swapping the bound ranges $R_2$ (all bounds of the subtree C) and $R_3$ (all bounds between the subtree and the target position). This swap consists of translating all bounds in the range $R_2$ by +2 and all bounds in $R_3$ by −4. By storing only these range translations, we achieve $O(c)$ space complexity. Hereinafter, we call the ranges of bounds which can be translated together simply translation ranges. The left side of the figure shows the insertion of a new node F as rightmost child of node B. The dashed lines of F depict that F is a virtual node prior to the insert. Again, this insertion is accomplished by swapping regions $R_2$ and $R_3$. Since we are using the active region approach for adding new nodes, the max value of the resulting version is incremented by +2 because a new node was added. Node deletion (and subtree deletion) is similar to insertion: The right of FIG. 3 shows the opposite of the left side: Node F is deleted by swapping the regions and reducing the max value.

Formally, let swap([a,b],[c,d]) be the function that swaps the interval [a,b] with the interval [c,d] under the preconditions that c=b+1 (the intervals are adjacent and the second one is behind the first one), a≤b∧c≤d (the intervals are well-formed, non-empty intervals). Let insrt([x,y],z) be the method that inserts non-empty interval [x, y] before z under the precondition that z∉[x, y] and x≤y. The function insrt is implemented through a swap:

$$insrt([x, y], z) = \begin{cases} swap([z, x-1], [x, y]), & \text{if } z < x \\ swap([x, y], [y+1, z-1]), & \text{otherwise} \end{cases}$$

Using insrt and the active region approach, implementing all update operations is straightforward:
insertBefore(b): insrt([max+1, max+2], b) max:=max+2
moveSiblingRangeBefore(v,v',b): insrt([v.low,v'.high],b)
deleteSiblingRange(v,v'): insrt([v.low, v'.high], max+1) max:=max (v'.high−v.low+1)
Since all update operations are now reduced to swap, updating a delta solely relies on efficient implementation of this function, as will be described below. In the example, the insertion is performed by executing swap([6,9],[10,11]), the move by swap([3,6], [7,8]), and the deletion by swap([6,7], [8,11]).

We represent version deltas compactly as the ordered set of all translation ranges that were introduced by updates that happened between the source and the target version. We represent the ranges by storing the value of their borders in the source space and in the target space. The value by which the ranges were translated can be inferred by computing the difference between these two numbers. We distinguish between bounds and borders: All values represented by the delta are values of (interval) bounds. A lower/upper border of a translation range is the least/greatest bound that lies in this range Because the translation ranges are densely arranged next to each other, it is sufficient to store only the lower border of the ranges, that is, the value of the lowest bound which lies inside the range. The upper border can be inferred by looking up the lower border of the successive range and substracting one. The highest range (that has no successor) is unbounded, i.e., its upper bound is the positive infinity.

Figure 4:
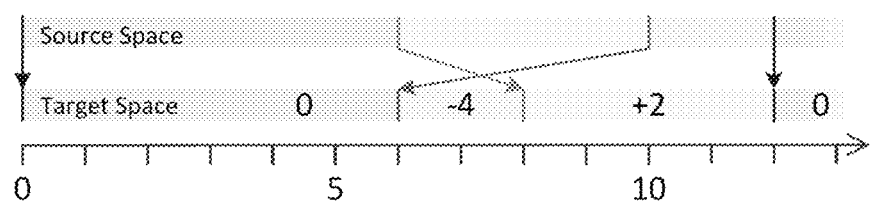
FIG. 4 illustrates an interval delta according to some embodiments.

FIG. 4 shows a graphical representation of how our approach represents a delta. Specifically, the figure shows the delta resulting from the node insertion which is depicted on the left of FIG. 3. The vertical bars represent the lower borders of the translation ranges and the arrows depict to which position these borders are translated. An update introduces at most three new translation ranges: The two ranges that were swapped ($R_2$ and $R_3$ in the example) and the range behind them ($R_4$ in the example). Since only the lower borders of translation ranges are stored, the range before the swapped ones ($R_1$ in the example) does not have to be adjusted; its upper border is adjusted implicitly. We use the notation R(s,t) to denote a translation range which maps from s in the source space to t in the target space. The width of the range is not included in this notation, as it is implicitly defined by the border of the following range in the delta. Thus, the delta depicted in FIG. 4 is written as {R(0,0), R(6,8), R(10,6), R(12,12)}.

Using this representation, the delta function δ(b) is implemented as follows: Find the translation range with the greatest lower border which is equal to or less than b. Let t be the translation of that range. Then, delta is defined as δ(b)=b+t. For example, the bound 7 in the source space lies in the yellow translation range (because its lower border 6 is the greatest which is less or equal to 7), so it is translated by +2, yielding δ(7)=9. Note that this representation also allows to compute $δ^{-1}$ similarly by applying the reverse translation. For example, the bound 6 in the target space lies in the green translation range. Therefore, $δ^{-1}(6)=6-(-4)=10$.

The representation shown in FIG. 4 is a conceptual model instead of a specific data structure. A suitable implementation of this model may satisfy the following conditions:

1. Because computing δ(b) comprises of finding the greatest lower border of a translation range which is less than or equal to b, the implementation allows finding such border in at most $O(\log c)$ which was defined as the upper bound for the time complexity of δ.

2. Since the implementation may also be used for the reverse mapping $δ^{-1}$, it allows execution of this operation in $O(\log c)$.

3. As shown below, it is possible to build a version delta incrementally by performing range swaps. The implementation provides efficient support for this operation.

Figure 5:
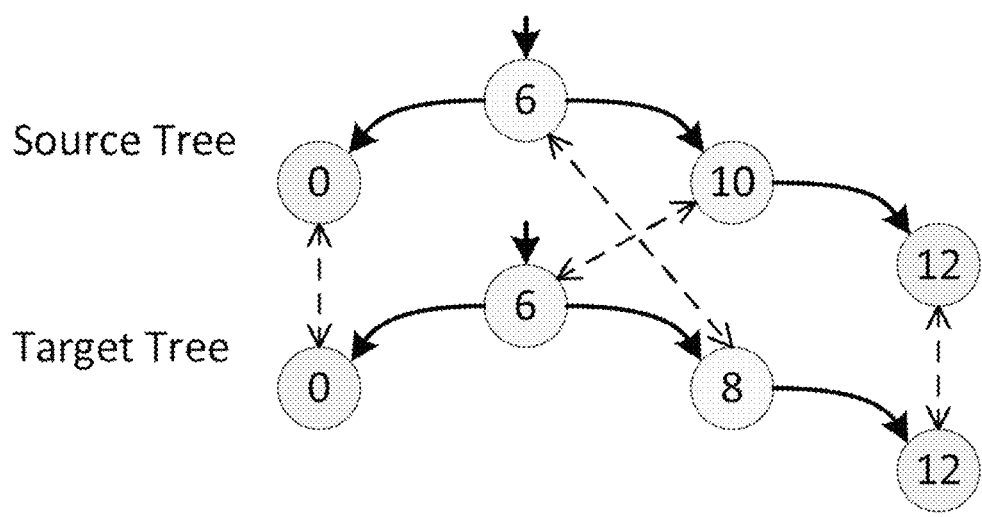
FIG. 5 illustrates a source version tree and a target version tree according to some embodiments.

One implementation uses self-balancing search trees to satisfy conditions 1 and 2, as they allow for $O(\log c)$ query time. Concretely, the implementation comprises two balanced search trees, one for the source and one for the target space. Consequently, we call the trees source tree and target tree. Using these trees enables efficient computation of δ and $δ^{-1}$. The keys in the search trees are the values for the lower bounds of the translation ranges. The payload in the search tree entries consists of a pointer to the corresponding node in the respective other search tree. The translation value can be omitted, because it can be calculated by following the pointer from the source tree node to the corresponding target tree node and subtracting the key in the target space from the key in the source space. FIG. 5 shows the source and target tree for the translation ranges from FIG. 4 using balanced binary search trees. The dashed arrows represent the pointers between the corresponding nodes in the trees.

A pair of source and target tree initially seems to be a memory-consuming data structure due to bidirectional pointers between corresponding nodes. However, the tree can be compressed well: Since one entry in the source tree always corresponds to exactly one entry in the target tree, it is possible to allocate these entries together. Such an entry pair does not need any pointers; instead, implicit address calculation can be used to get from the source entry to the target entry and vice versa. For simplicity, we will still refer to pointers below. However, the pointers are only used for the sake of clarity and can be optimized away.

Using the source/target tree representation, the implementation of δ(b) is straightforward: Usual search tree lookup in the source tree is used to find the translation range with the greatest lower border less or equal to b. By following the pointer to the corresponding node in the target tree and lookup up its value there, the translation value is calculated. The implementation of $δ^{-1}(b)$ is equally straightforward: Lookup b in the target tree instead of the source tree and apply the negated translation value.

The size of the delta is in $O(c)$ but is also bounded by the size of the hierarchy: The largest delta contains one translation range for each bound of the hierarchy. Repeated updates of a node or subtree (e.g., moving a tree around twice) do not yield extra translation ranges but only update the already existing changes. Therefore, the size of a delta can also be less than $O(c)$ in the case of repeated updates of nodes.

We have shown an approach for storing version deltas by representing translation ranges as nodes in two search trees which are linked with each other. This approach allows computing the δ function and its inverse $δ^{-1}$ efficiently. The remaining challenge is to build this data structure efficiently. There are different possible scenarios for building a delta: One scenario (which we call "static") could be the case that the source and the final target version are available as usual interval encodings and the delta is to be inferred from them. A more dynamic scenario would consist of building the delta incrementally: Whenever a new update is performed on the tree, the resulting translation range swap is added to the data structure. Handling this scenario efficiently is more difficult and requires using specially augmented search trees.

In the static scenario we assume that the source and target version for which to build a delta are fully available as interval encodings. This could be the case in applications where a user fetches a whole version from the database, edits it with a third party program (e.g., a graphical tree editor) and then saves the result back to the database creating a new versions. Another use case would be the periodic gathering of snapshots from the web. The operations performed on the tree are not known in this scenario, only the resulting interval encoding is available or is constructed on the fly. Although it might seem easier to infer the delta if the update operations are known, the opposite is actually the case: Inferring a delta from two interval encodings is a straightforward and efficient operation. There is only one requirement: Given a bound value in the interval encoding, it must be possible to infer the node to which this bound value belongs and a matching of nodes must be available; such matching is either implicit if the nodes carry unique identifiers (as in HR hierarchies, our example, and many other use cases) must be used to match nodes in the two versions.

The algorithm for inferring the delta from two interval representations $I_s$ and $I_t$ is as follows. Traverse the interval encoding $I_s$ from the lowest to highest bound. For each bound b, find the corresponding bound in $I_t$, i.e. look up the node v to which b belongs and look up the corresponding bound b' of the node matching v in $I_t$. Compute the translation t by subtracting b' from b. Store this translation as t' until the next bound is traversed. Whenever the translation value of adjacent bounds changes, i.e., t≠t', then insert a new translation range R(b,b') into the delta. In addition, insert a translation range border for the first bound that is traversed.

Figure 6:
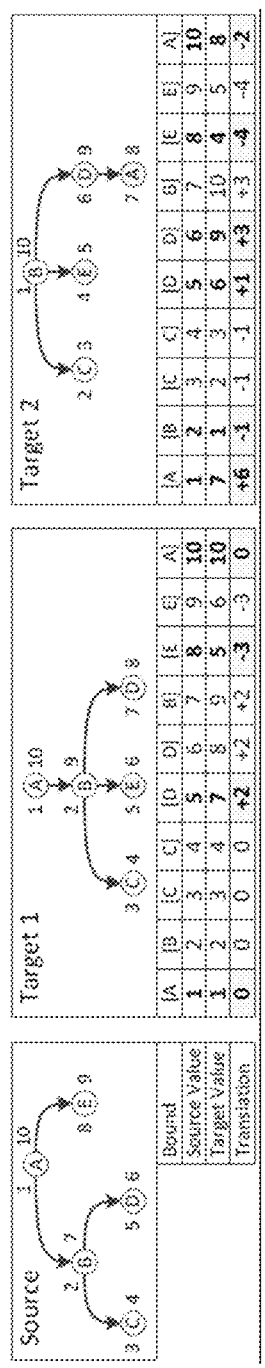
FIG. 6 illustrates determination of an interval delta based on two interval encodings according to some embodiments.

FIG. 6 shows the result of the algorithm comparing a source hierarchy with two target hierarchies. The source hierarchy is shown on the left. The lower and upper bounds belonging to each node are displayed on the left and right of the node, respectively. The middle of the figure shows a target hierarchy where only one update has occurred: The node E was moved behind node C. Below the hierarchy, the resulting bound values are displayed. The first row shows the interval bounds in the source interval encoding $I_s$. The second row shows the values of the corresponding bounds in $I_t$. The third row shows the resulting translation. The delta is inferred by the third row from left to right and inserting a new translation range border whenever the value changes (columns with changing value are hightlighted). In addition, as mentioned, a translation range border is always inserted for the first column. So, in the example, the value changes three times: First, it changes from 0 to +2 at bound 5, then it changes from +2 to −3 at bound 8, and finally, the value changes from −3 to 0 at bound 10. An extra border is inserted at bound 1 which is the first bound to be traversed. Thus, the resulting delta contains four translation ranges, namely {R(1,1), R(5,7), R(8,5), R(10,10)}. The right side of FIG. 6 shows a target hierarchy where more changes were introduced. Consequently, there are also more translation ranges (6) in the resulting delta.

The previous section introduced a scheme which bulk-builds a delta from two fully materialized interval encodings. This approach has two drawbacks:

1. It is often undesirable to fully materialize both interval encodings of the source and the target version. The advantage of our approach is that one does not need to materialize these encodings. To leverage this advantage, another technique must be used for updating version deltas.

2. Rather than introducing single changes at a time, all changes must already be contained in the interval encoding of the target version. Since integer interval encodings are inefficient when it comes to updates, this poses a problem.

It would be more appropriate if a version delta could directly be updated efficiently without having to infer any explicit interval encodings. As mentioned above, every atomic update can be modeled by a swap of two consecutive translation ranges. Thus, an efficient update mechanism performs this swap efficiently. The operation swap([a,b],[c,d]) for a delta δ performs the swap in the target space. The bound coordinates a,b,c,d are also in the target space. Conceptually, the operation is implemented as follows:

1) Insert the translation ranges $R(\delta^{-1}(a),a)$, $R(\delta^{-1}(c),c)$, and $R(\delta^-(d+1),d+1)$. If any of the ranges already exists, do not insert it again. For all translation ranges $R(s,t)$ in $\delta$ with $t \in [a,b]$, translate t by the size of $[c,d]$ (i.e., by $d-c+1$).

2) For all translation ranges $R(s,t)$ with $t \in [c,d]$, translate t backwards by the size of $[a,b]$.

Figure 7:
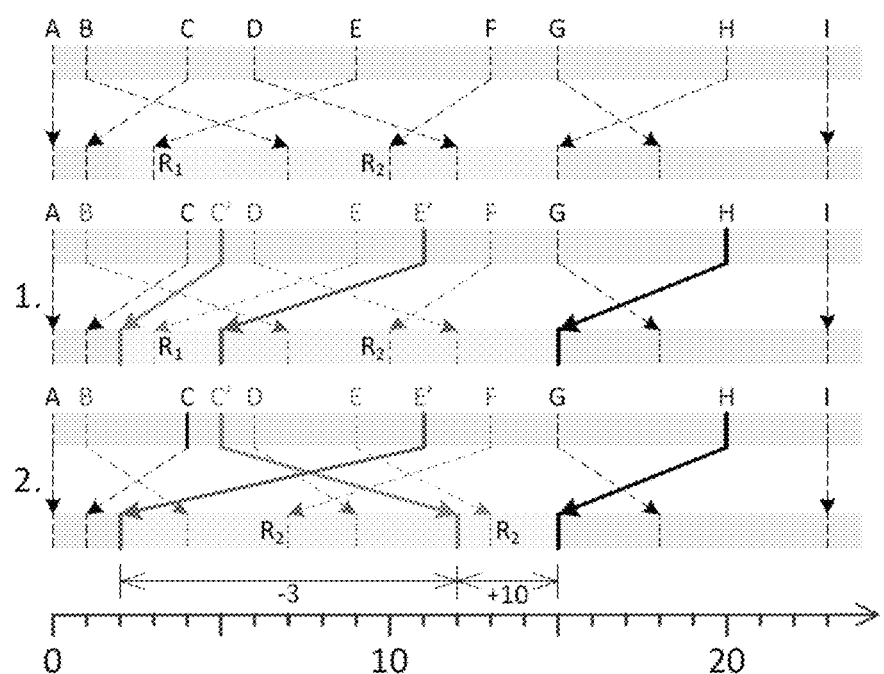
FIG. 7 determination of an interval delta based on hierarchy updates according to some embodiments according to some embodiments.

The top of FIG. 7 depicts a delta in which the ranges $R_1=[2,4]$ and $R_2=[5,14]$ are to be swapped. The delta already contains nine translation ranges (A-I). The middle of the figure shows the result after performing the first step of the algorithm: $C'=R(5,2)$, which is the lower border of $R_1$, and $E'=R(11,5)$, which is the lower border of $R_2$, are inserted. The lower border $H=R(20,15)$ of the range after $R_2$ is already included in the delta, therefore, it can be reused and no new border is inserted. The bottom of the figure shows the delta after performing the second step of the algorithm: The target values of translation ranges that lie in $R_1$ in the target space have been translated by +10 and the target values of those in $R_2$ have been translated by −3.

The implementation of swap reveals two performance bottlenecks: First, the target value of all bounds in $R_1$ (marked orange in the figure) and $R_2$ (marked green) has to be adjusted. On average, this results in n/2 adjustments which yields an infeasible linear runtime if done naïvely. Next, since the target values are also keys in a search tree, they cannot be simply adjusted. Instead, their swapped position is updated in the search tree as well by also swapping the nodes in the search tree. Otherwise, the tree would no longer be ordered by key and thus would malfunction. Again, n/2 nodes in the search tree need to be swapped. If this is done naïvely by deletion and reinsertion, it would even yield $O(n \log n)$ time complexity.

To allow efficient updates of an interval delta in $O(\log n)$, the search tree which models the target space has to be augmented to allow adjusting multiple keys at once and swapping ranges of search tree nodes efficiently.

The efficient swapping of nodes can be accomplished by adding the split and join functionality to the self-balancing search tree: The split(T,k) function splits the search tree T before a key k, resulting in a tree that holds all keys <k and one that holds all keys ≥k. Both resulting trees are appropriately balanced. Given two search trees $T_1$ and $T_2$ where all keys in $T_2$ are greater than all keys in $T_1$, the join($T_1,T_2$) function concatenates the trees resulting in a new search tree which contains all keys of the trees and must be appropriately balanced again. Although both functions are quite uncommon since they are not needed by RDBMSs, an efficient $O(\log n)$ implementation exists for all common self-balancing search trees. We can swap two ranges of search tree nodes by first splitting the tree at the borders of these ranges and then joining the resulting trees in a different order. One can imagine this operation as simply cutting the tree into smaller trees representing the different ranges and then gluing these trees together in the desired order. Such a swap consists of three splits and three joins and is therefore in $O(\log n)$ matching the desired time complexity bound.

Figure 8:
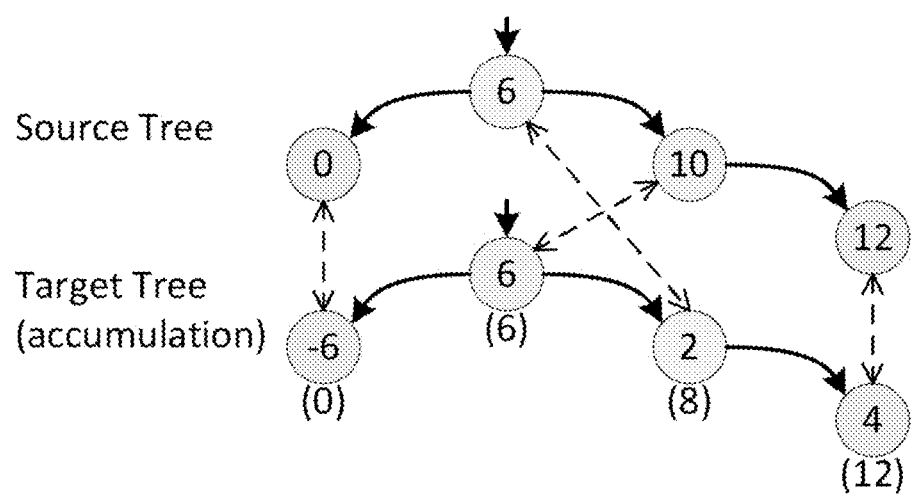
FIG. 8 illustrates an accumulation tree according to some embodiments.

The second requirement is satisfied by replacing the ordinary search tree with a slightly adapted implementation which we call accumulation tree. An accumulation tree is a search tree in which each node only stores a part of its own key. The real key of a node v is obtained by adding (accumulating) all values on the path from v to the root. Since a search tree already traverses this path during the key lookup, the accumulation of the key of v is cheap. FIG. 8 shows the delta from FIG. 5 with an accumulation tree used as target tree. The resulting accumulated values (which are equal to the values of the original target tree in FIG. 5) are shown in parenthesis below the nodes. For example, the rightmost node has a value of 12. This value is obtained by accumulating all values (6, 2, 4) on the path from the root to this node.

The idea behind the accumulation tree introduces an important property: All keys in a subtree rooted at a node v can be translated by simply adjusting the value of v, resulting in $O(1)$ time complexity instead of $O(n)$ (with n being the size of the subtree). However, the tree introduces a small maintenance overhead: Whenever performing rotations to restore the balance of the tree, the values of the two rotated nodes and the value of the root of the middle sub-tree have to be adjusted. For left rotations, this is the left child of the right child of the rotated node. For right rotations, this is the right child of the left child of the rotated node. Otherwise, the rotation would alter the accumulated values.

Figure 9:
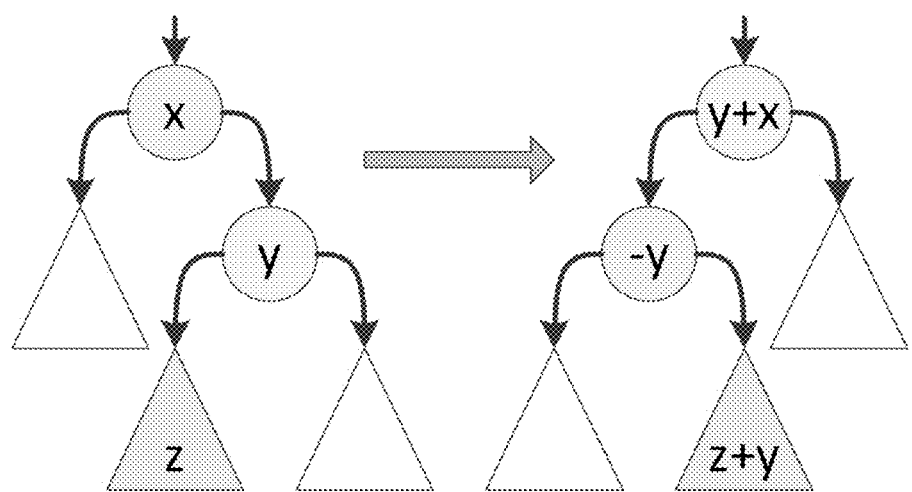
FIG. 9 illustrates rules for updating node values after a left node rotation according to some embodiments.

FIG. 9 depicts the rules for updating the values after a left rotation. If the node that is rotated has the value x, its right child has value y and the left child of the right child has value z, then the three nodes must receive the values y+x, −y, and z+y, respectively. For example, the root of the subtree in the middle has x+y+z as accumulated value before the rotation. Afterwards, it still has (y+x)+(−y)+(z+y)=x+y+z. All other nodes behave similarly, so the rotation does not alter any accumulated value. Performing a right rotation is similar.

Figure 10:
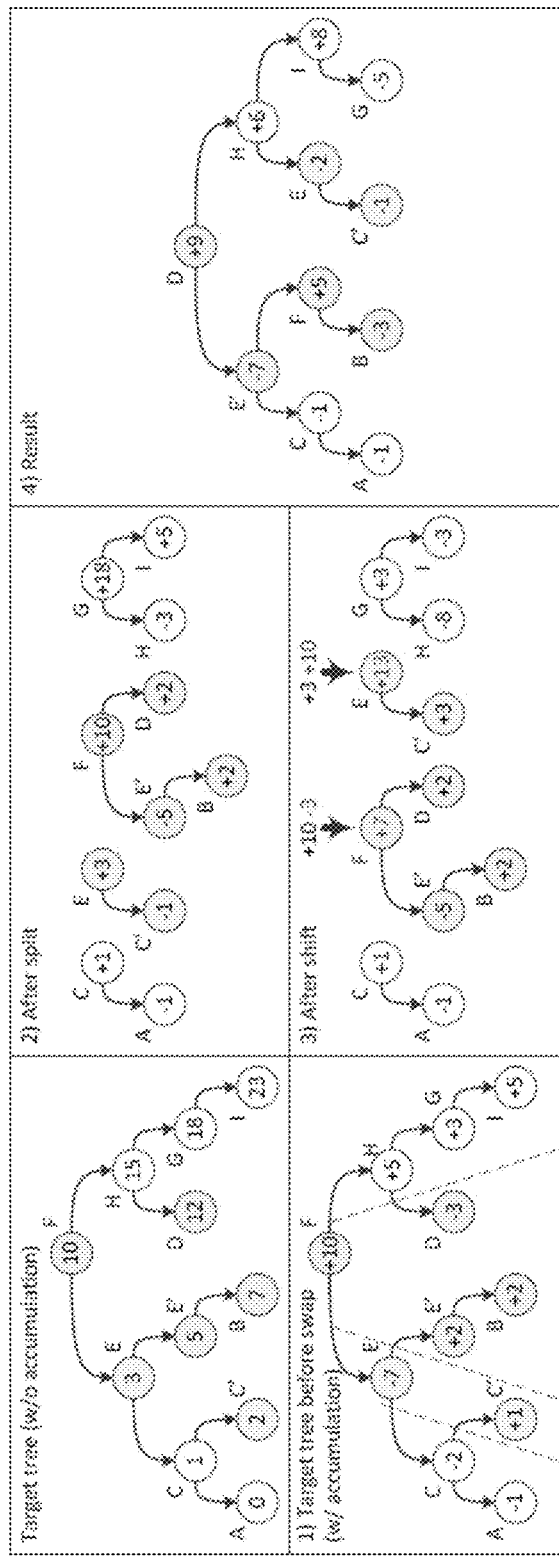
FIG. 10 illustrates swapping two translation ranges according to some embodiments.

Using the accumulation tree in combination with the split and join operations, we are able to achieve the swap of two translation ranges in $O(\log n)$. The steps of the algorithm performing the swap from FIG. 7 are depicted in FIG. 10. On the top left of the figure, the target tree (without using accumulation) of the model is shown. The source tree is completely omitted in the figure, as it is not altered by a swap, except that the new translation ranges are entered at appropriate positions. The lower left part of the figure (Step 1) shows the target tree using from the top, but now using the accumulation tree. For example, the node I has a value of 23. This value is represented in the accumulation tree by the accumulated values 5,3,5,10. The dashed lines represent the positions where the tree is split. Step 2 of the figure shows the resulting trees after the splits are performed. Note that the split also rebalances the resulting trees. The next step (3) is to apply the translations to the two ranges. The accumulation tree allows this operation by simply adjusting the value in the root. The root of $R_1$ (F) is translated by −3 and the root of $R_2$ (E) is translated by +10. The trees are then joined to yield the resulting tree. Of course, the tree for $R_2$ is joined to the left of $R_1$ to achieve the swap, so the trees are joined in the order C, F, E, G. The resulting (rebalanced) tree is shown on the right of the figure. Thus, in conclusion, a swap of two adjacent translation ranges is simply performed by first splitting the tree, applying the transformations to the roots of the resulting trees and then re-joining the trees in a different order. Since the time complexity of split and join is in $O(\log n)$ and the complexity of the translation in the accumulation tree is in $O(1)$, the resulting time complexity is $O(\log n)$. In contrast to the linear time complexity of the basic data structure, the accumulation tree thus allows for efficient updates.

The previous section has introduced an efficient storage technique for interval deltas. Such delta maps interval bound from a version V to another version V' and vice versa. Now assume a large version history with n versions $V_0, \ldots, V_{n-1}$. To be able to answer queries for an arbitrary version $V_i$, one or more deltas must exist which eventually lead from a base version to version $V_i$.

Without loss of generality, we will hereinafter assume a linear version history (without any branches) with only one base version which is the eldest version $V_0$. The version indices are sorted by the age of the version, so $V_i$ is the version right before $V_{i+1}$ and right after $V_{i-1}$. We define the size of a delta, written as $|\delta|$, by the number of versions captured by it. For example, the delta $\delta_{V_{20} \mapsto V_{30}}$ would have the size 10, because it covers all changes introduced in the ten versions versions $V_{21}, \ldots, V_{30}$. If a constant number of changes per version is assumed, the size of the delta is proportional to its memory consumption.

The interval bounds of each node are known for the base version $V_0$. Since we represent a versioned hierarchy by a table and the DeltaNI index, we store the interval bounds of $V_0$ in the table itself by adding a low and high column. Deltas are used to transform these bounds into each other version. The bounds in $V_0$ also pose durable identifiers for all the nodes, since they will not change. By maintaining an index over the low column, one can access a node by its low bound in $V_0$. To retrieve the node belonging to a bound b in another version, we need to apply inverse deltas to transform b back to $V_0$; then we can lookup the corresponding node via the index.

Let $\delta_1, \ldots, \delta_m$ be a sequence of deltas where each delta maps $\delta_i$ from a version to the version of the subsequent delta $\delta_{i+1}$. If the first delta maps $\delta_i$ from $V_s$ and the last delta maps to $V_t$, then we can retrieve the bound $b_t$ in $V_t$ for a bound $b_s$ in $V_s$ by applying all deltas in the sequence:

$$b_t = \delta_m(\delta_{m-1}(\ldots \delta_2(\delta_1(b_s))\ldots))$$

By applying the deltas reversely in the opposite order, we can also map back from $V_t$ to $V_s$.

The time complexity of such query is in $O(m \log c)$, where c is the maximum of changes contained in any of the deltas in the sequence. So, for fastest query times, a sequence length of one would be best. This, however, implies that a delta from a base version to each other version must exist. Since we assume a linear version history as the worst case, a change introduced in a version $V_i$ will also be stored in the interval deltas between the base version and all versions which are more recent than $V_i$. When assuming a constant number of changes per version, maintaining deltas from the base version to each other version would require $O(n^2)$ space in the worst and best case, because each change is contained in n/2 deltas on average. This is not feasible for hierarchies with millions of versions. Another extreme would be to save only the deltas from version $V_i$ to $V_{i+1}$. Assuming a constant number of changes per version would yield $O(n)$ space complexity, because each change is only stored in the delta for the version in which it was introduced. This is the strategy with the least space consumption. However, a query in version $V_i$ would then require i delta applications since all deltas of versions older than $V_i$ have to be applied one by one. On average, this yields $O(n)$ query complexity which is infeasible for large hierarchies, as well.

We achieve a good space/time trade-off by enforcing an exponential distribution of the delta sizes. That is, some few deltas cover huge version ranges while most deltas cover only a few versions. The large deltas can be used to get "near" the target version quickly. There, the small deltas are used to get exactly to the target version. This approach is comparable to the one of skip lists or to the finger tables in the peer-to-peer protocol.

Figure 11:
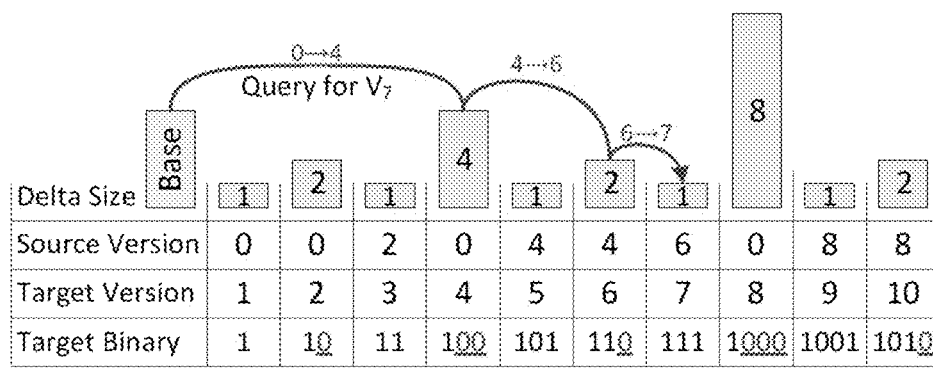
FIG. 11 illustrates the size of a first ten interval deltas of a version history according to some embodiments.

Our approach uses the number of trailings zeros in the binary representation of the id of a version to determine the size of the delta leading to this version. Precisely, given a version $V_i$, the size of the delta $\delta$ which has $V_i$ as target version is calculated as $|\delta|=2^{tz(i)}$, where tz(x) is the number of trailing zeros in the binary representation of x. For example, version 27 has the binary representation $11011_2$. Since this binary string has no trailing zeros, this version will be represented by the delta $\delta_{V_{26} \to V_{27}}$ which has a size of 1. In contrast, version 36 corresponds to the binary string 100100 which has two trailing zeros. This results in the delta $\delta_{V_{32} \to V_{36}}$ of size $2^2=4$. FIG. 11 depicts the size of the first ten interval deltas of a version history.

To query a version $V_i$ using this technique, one has to start at the base version and execute "hops" which become smaller and smaller. The arrow in FIG. 11 shows how a query for version 7 is processed. The algorithm for finding the hops for version $V_i$ simply consists of scanning the bit positions j of the binary representation of i from most significant bit to least significant bit. Whenever a one bit is found at position j, take one hop. The target version is i with all less significant bits than j zeroed out. For example, a query in version $i=19=10011_2$ would be processed as follows: The highest one bit is j=4 (j is counted from least to most significant bit, starting with zero for the least significant one), so the first hop is to version $10000_2=16$. The next one is at j=1, resulting in the hop to $10010_2=18$. The final hop for the last one bit at j=1 is $10011_2$ which reaches the target version 19. The resulting deltas to be applied are $V_0 \to V_{16}$, $V_{16} \to V_{18}$, and $V_{18} \to V_{19}$.

Since the algorithm takes one hop per one-bit of the version id i and version id bit lengths are logarithmic in the number of versions, the number of deltas to be applied to reach a version $V_i$ is $\lceil \log_2(i) \rceil$ in the worst case (when the version id consists only of one-bits) and 1 in the best case (when the version id is a power of two). When maintaining a version history of n versions with n being a power of two, each bit of a randomly chosen version id i is one or zero with the same probability, so the algorithm applies $\log_2(n)/2$ deltas on average.

A change introduced in version $V_i$ is contained in the version delta for $V_i$ and all version deltas of all higher versions where i is a power of two. For example, a change introduced in version 7 in contained in the deltas $V_0 \to V_7$, $V_0 \to V_8$, $V_0 \to V_{16}$, $V_0 \to V_{32}$, and so on. Obviously, for a version history of n versions, there are logarithmically many versions which are a power of two, so each change is contained in at most $1+\lceil \log_2 n \rceil$ versions. Since one change needs a constant amount of space, a version history with n versions and constant number of changes per version can be stored using $O(n \log n)$ space ($O(n)$ changes in total, each being stored in $O(\log n)$ versions).

As already shown, applying a delta of size c to a single bound has a time complexity of $O(\log c)$. However, the more relevant question is the time complexity of retrieving the value of a bound b in a version $V_i$ which needs to apply more than one delta. In the worst case, when the binary representation of i has only ones in it, the algorithm must apply $\log_2 i$ deltas. The number of versions covered by each of these deltas is exponentially distributed: The first covers i/2 versions, the second i/4 versions, and so on until the last one only covers a single version. If we assume a constantly bounded number of changes c per version (which is a reasonable assumption if new versions are created regularly), the number of changes contained in the deltas is proportional to the number of versions v covered by it and thus the complexity of applying this delta is $O(\log v)$. Consequently, the complexity of applying all the deltas is $O(\Sigma_{j=0}^{\log_2 i} \log 2^j) = O(\Sigma_{j=0}^{\log_2 i} j) = O(\log^2 i)$ in the worst case. In the best case, the version number is a power of two and thus only one delta has to be applied, yielding $O(\log i)$.

During the generation of the exponentially sized deltas, smaller deltas have to be merged to yield larger ones. For example, the delta $V_0 \rightarrow V_8$ is to built by first merging the deltas $V_0 \rightarrow V_4$, $V_4 \rightarrow V_6$, and $V_6 \rightarrow V_7$, which yields the delta $V_0 \rightarrow V_7$. Now, there are two equally applicable strategies: One strategy is to apply the incoming changes for $V_8$ directly to the delta $V_0 \rightarrow V_7$, yielding the delta $V_0 \rightarrow V_8$ without further merges. Another strategy is to gather the changes for $V_8$ in a small delta $V_7 \rightarrow V_8$ and finally merge $V_0 \rightarrow V_7$ with $V_7 \rightarrow V_8$ to yield the final delta $V_0 \rightarrow V_8$. Regardless of the strategy used, an operation for merging two deltas is required.

Let, $\delta_{V \rightarrow V'}$ and $\delta_{V' \rightarrow V''}$ be two deltas which are connected via the version V', i.e., V' is the source of the one and the target of the other delta. We define the operation merge $(\delta_{V \rightarrow V'}, \delta_{V' \rightarrow V''})$ which merges the changes in the two deltas yielding the delta $\delta_{V \rightarrow V''}$. The resulting delta function must be the composition $\delta_{V \rightarrow V'} \circ \delta_{V' \rightarrow V''}$, i.e.:

$$\forall b \in N \cdot \delta_{V \rightarrow V''}(b) = \delta_{V' \rightarrow V''}(\delta_{V \rightarrow V'}(b))$$

The merge($\delta_1, \delta_2$) function can be implemented as follows: Start with an empty delta $\delta$. For each translation range R(s,t) in $\delta_1$, compute t'=$\delta_2$(t) and insert R(s,t') into $\delta$. Next, for each translation range R(s,t) in $\delta_2$, compute s'=$\delta_1^{-1}$(s). If no translation rule with source value s' exists in $\delta$, then add R(s', t) to $\delta$.

The implementation basically adjusts all translation ranges in the two deltas to incorporate the changes of the other delta as well. Ranges in the prior delta $\delta_1$ need their target values adjusted by $\delta_2$, since the resulting delta maps to the target space of $\delta_2$. The source values of the ranges in $\delta_2$ need to be adjusted "backwards" by the inverse of $\delta_1$, because the resulting delta maps from the source space of $\delta_1$. Since each range in $\delta_1$ and $\delta_2$ adds at most one translation range to the resulting delta, the delta size $|\delta|$ is at most $|\delta_1|+|\delta_2|$. However, when the ranges of $\delta_2$ are processed, they are only added if no delta with the same source value already exists. Thus, the resulting delta size may be smaller than $|\delta_1|+|\delta_2|$. The omission of a range is executed if both versions transform the range. For example, if $\delta_1$ moves a node X and $\delta_2$ moves the same node again, then they will both contain a translation range starting at the lower bound of X. The resulting delta will only contain one rule for this lower bound.

Figure 12:
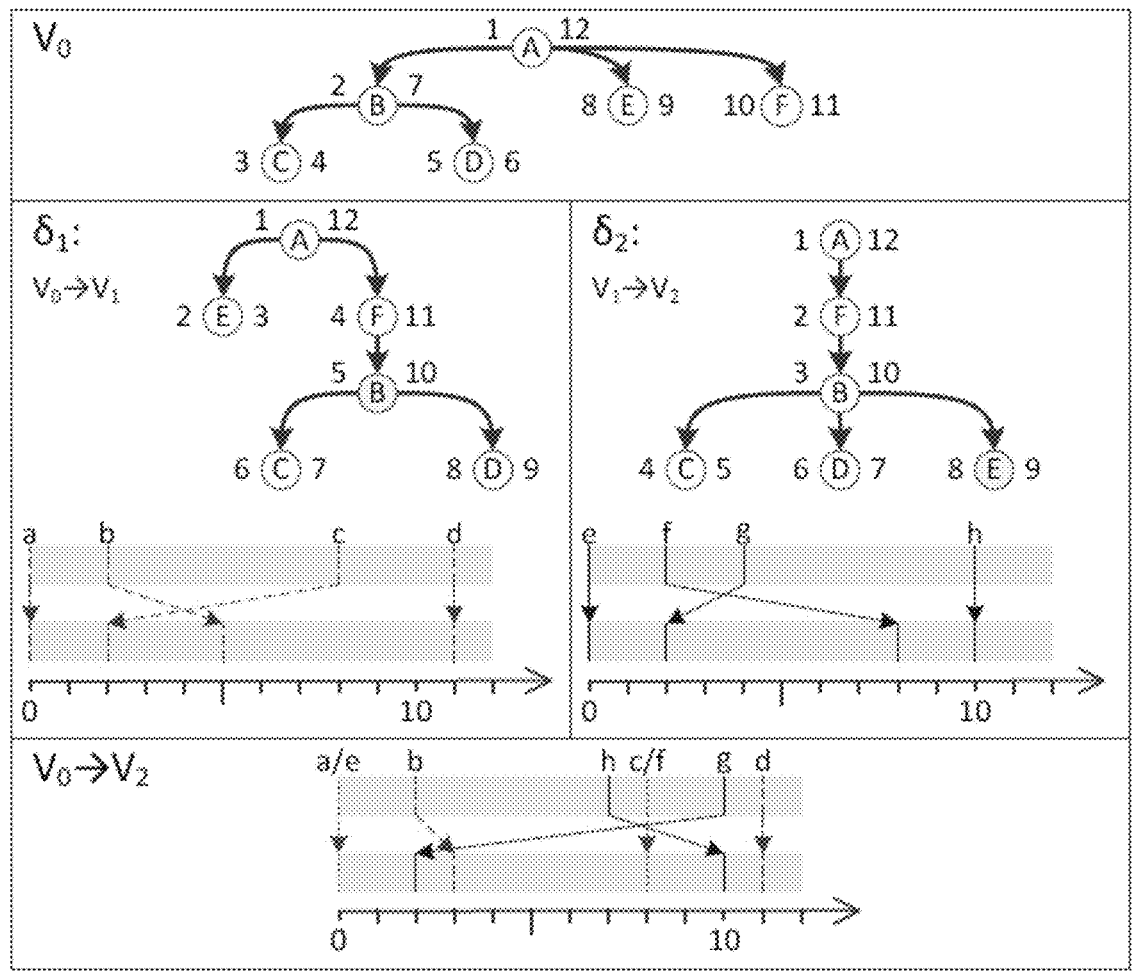
FIG. 12 illustrates merging of two interval deltas according to some embodiments.

FIG. 12 shows an example for a merge. The source tree version $V_0$ is shown on top. In version $V_1$ (left), the subtree B was moved below F. In $V_2$ (right), node E was moved below B. The deltas $\delta_1$ ($V_0 \rightarrow V_1$) and $\delta_2$ ($V_1 \rightarrow V_2$) are displayed below the respective tree. A merge of these deltas results in the delta $V_0 \rightarrow V_2$ which is shown on the bottom of the figure. The translation ranges in the deltas are named with the letters a to h. The letters in the resulting delta show from which translation ranges the ranges in this delta originate. For example, the leftmost translation rule R(0,0) is contained in both deltas as a and e, respectively. Thus, the two ranges are merged into one range ale. Another example is the range c/f. The first delta has the rule c which is R(8,2). When applying $\delta_2$(2), the resulting target value is 8 (2 lies in range f which is translated by +6), so the resulting rule is R(8,8) which is c/f. The second delta contains the rule f which is R(2,8). The resulting source value for this rule is $\delta_1^{-1}$ (2)=8 (2 in the target space of $\delta_1$ lies in rule c which has a translation of −6, so the inverse translation is +6). Since R(8,8) already exists, no further range is added. From this example: If a bound is first translated from 8 to 2 and then translated back from 2 to 8, then both translations can be combined to R(8,8).

Since each translation range in the deltas has to be processed (linear) and for each range, a delta must be computed (log) and a range must be inserted (log), the resulting time complexity of the merge operation is $O(n \log n)$ where n is the maximum of $|\delta_1|$ and $|\delta_2|$.

The more versions are to be covered by a delta, the more merges have to be performed to build the delta. The number of deltas to be merged for a delta that covers v versions is log y. Thus, building a large delta pack could stall the database for a few seconds, which is infeasible. This problem can be mitigated by merging deltas ahead of time in the background. For example, the delta $V_0 \rightarrow V_{64}$ requires the merge of the deltas $V_0 \rightarrow V_{32}$, $V_{32} \rightarrow V_{48}$, $V_{48} \rightarrow V_{56}$, $V_{56} \rightarrow V_{60}$, $V_{60} \rightarrow V_{62}$, $V_{62} \rightarrow V_{63}$, and $V_{63} \rightarrow V_{64}$. Once version $V_{48}$ is built, the deltas $V_0 \rightarrow V_{32}$ and $V_{32} \rightarrow V_{48}$ can already be merged generating delta $V_0 \rightarrow V_{48}$. Once version $V_{56}$ is built, this delta can be merged with $V_{48} \rightarrow V_{56}$ to build the delta $V_0 \rightarrow V_{56}$, and so on. Using this strategy, only the latest two deltas need to be merged at a time, drastically reducing the time of a single delta build and thus preventing longer stalls. However, this strategy requires to maintain the intermediate delta merges like $V_0 \rightarrow V_{56}$ and thus increases memory consumption.

Consider a version history which currently contains n versions. It is desirable to achieve the best case query complexity when querying the most recent version $V_n$. Not only is it much more probable that queries will be executed in this version, but the deltas to this version also need to be calculated when performing updates. To achieve this, we not only maintain the exponentially distributed deltas but also an additional large delta $\delta_{0 \rightarrow n}$ which can be used to directly reach the most recent version. The additional maintenance of this delta is only a neglectable constant space overhead in comparison to the exponentially distributed deltas.

Figure 13:
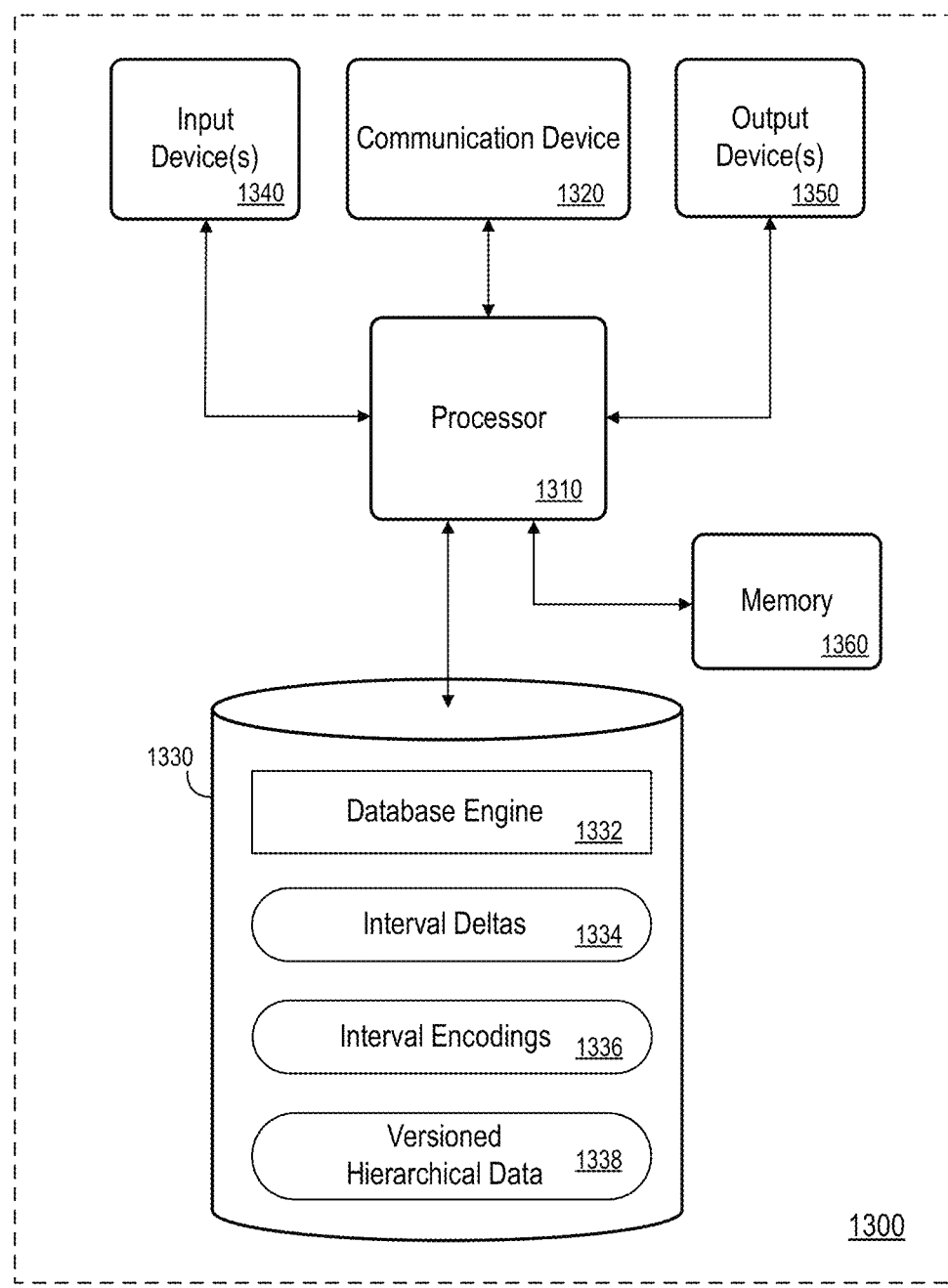
FIG. 13 is a block diagram of a computing system according to some embodiments.

FIG. 13 is a block diagram of system 1300 according to some embodiments. System 1300 may comprise a general-purpose computing system and may execute program code to perform any of the processes described herein. System 1300 may comprise an implementation of database 100 according to some embodiments. System 1300 may include other unshown elements according to some embodiments.

System 1300 includes processor 1310 operatively coupled to communication device 1320, data storage device 1330, one or more input devices 1340, one or more output devices 1350 and memory 1360. Communication device 1320 may facilitate communication with external devices, such as a reporting client, or a data storage device. Input device(s) 1340 may comprise, for example, a keyboard, a keypad, a mouse or other pointing device, a microphone, knob or a switch, an infra-red (IR) port, a docking station, and/or a touch screen. Input device(s) 1340 may be used, for example, to enter information into apparatus 1300. Output device(s) 1350 may comprise, for example, a display (e.g., a display screen) a speaker, and/or a printer.

Data storage device 1330 may comprise any appropriate persistent storage device, including combinations of magnetic storage devices (e.g., magnetic tape, hard disk drives and flash memory), optical storage devices, Read Only Memory (ROM) devices, etc., while memory 1360 may comprise Random Access Memory (RAM).

Database engine 1332 may comprise program code executed by processor 1310 to cause apparatus 1300 to perform any one or more of the processes described herein. Embodiments are not limited to execution of these processes by a single apparatus. interval deltas 1334, interval encodings 1336 and versioned hierarchical data 1338 may be implemented as described above. As also described above, database 100 may be implemented using volatile memory such as memory 1360. Data storage device 1330 may also store data and other program code for providing additional functionality and/or which are necessary for operation of system 1300, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those skilled in the art will recognize other embodiments may be practiced with modifications and alterations to that described above.

What is claimed is:

1. A computing system comprising:
    a memory storing processor-executable program code; and
    a processor to execute the processor-executable program code to:
        determine a first interval encoding of a first version of a hierarchy of nodes, the hierarchy of nodes comprising hierarchical data in a relational database;
        determine a second version of the hierarchy of nodes of the hierarchical data;
        determine a first difference between the first version of the hierarchy of nodes and the second version of the hierarchy of nodes;
        determine a first swap of two consecutive translation ranges of the first interval encoding, the first swap representing the first difference;
    determine a second difference between the first version of the hierarchy of nodes and the second version of the hierarchy of nodes;
        determine a second swap of a second two consecutive translation ranges of the first interval encoding, the second swap representing the second difference;
        store a record of the first swap representing the first difference and a record of the second swap representing the second difference;
        generate a versioned history of the hierarchical data in a relational database based on the stored records of the first swap and the second swap; and
        execute a query on the versioned history of the hierarchical data generated based on the stored records of the first swap and the second swap.

2. A computing system according to claim 1, the first swap comprising a first shift amount of a first one of the two consecutive translation ranges and a second shift amount of a second one of the two consecutive translation ranges.

3. A computing system according to claim 1, the first swap comprising a first shift amount of a first one of the two consecutive translation ranges and a second shift amount of a second one of the two consecutive translation ranges, and
    the second swap comprising a third shift amount of a first one of the second two consecutive translation ranges and a fourth shift amount of a second one of the second two consecutive translation ranges.

4. A computing system according to claim 1, the processor to further execute the processor-executable program code in order to cause the computing system to:
    determine a third version of the hierarchy of nodes of the hierarchical data;
    determine a second difference between the second version of the hierarchy of nodes and the third version of the hierarchy of nodes;
    determine a second swap of two consecutive translation ranges of the first interval encoding, the second swap representing the second difference.

5. A non-transitory computer-readable medium storing program code, the program code executable by a processor of a computing system to cause the computing system to:
    determine a first interval encoding of a first version of a hierarchy of nodes, the hierarchy of nodes comprising hierarchical data in a relational database;
    determine a second version of the hierarchy of nodes of the hierarchical data;
    determine a first difference between the first version of the hierarchy of nodes and the second version of the hierarchy of nodes;
    determine a first swap of two consecutive translation ranges of the first interval encoding, the first swap representing the first difference;
    determine a second difference between the first version of the hierarchy of nodes and the second version of the hierarchy of nodes;
    determine a second swap of a second two translation ranges of the first interval encoding, the second swap representing the second difference;
    store a record of the first swap representing the first difference and a record of the second swap representing the second difference; and
    generate a versioned history of the hierarchical data in a relational database based on the stored records of the first swap and the second swap; and
    execute a query on the versioned history of the hierarchical data generated based on the stored records of the first swap and the second swap.

6. A medium according to claim 5, the first swap comprising a first shift amount of a first one of the two consecutive translation ranges and a second shift amount of a second one of the two consecutive translation ranges.

7. A medium according to claim 5, the first swap comprising a first shift amount of a first one of the two consecutive translation ranges and a second shift amount of a second one of the two consecutive translation ranges, and
    the second swap comprising a third shift amount of a first one of the second two consecutive translation ranges and a fourth shift amount of a second one of the second two consecutive translation ranges.

8. A medium according to claim 5, the program code further executable by a processor of a computing system to cause the computing system to:
- determine a third version of the hierarchy of nodes of the hierarchical data;
- determine a second difference between the second version of the hierarchy of nodes and the third version of the hierarchy of nodes;
- determine a second swap of two consecutive translation ranges of the first interval encoding, the second swap representing the second difference.

9. A computer-implemented method comprising:
- determining a first interval encoding of a first version of a hierarchy of nodes, the hierarchy of nodes comprising hierarchical data in a relational database;
- determining a second version of the hierarchy of nodes of the hierarchical data;
- determining a first difference between the first version of the hierarchy of nodes and the second version of the hierarchy of nodes;
- determining a first swap of two consecutive translation ranges of the first interval encoding, the first swap representing the first difference;
- determining a second difference between the first version of the hierarchy of nodes and the second version of the hierarchy of nodes;
- determining a second swap of a second two consecutive translation ranges of the first interval encoding, the second swap representing the second difference;
- storing a record of the first swap representing the first difference and a record of the second swap representing the second difference; and
- generating a versioned history of the hierarchical data in a relational database based on the stored records of the first swap and the second swap; and
- executing a query on the versioned history of the hierarchical data generated based on the stored records of the first swap and the second swap.

10. A method according to claim 9, the first swap comprising a first shift amount of a first one of the two consecutive translation ranges and a second shift amount of a second one of the two consecutive translation ranges.

11. A method according to claim 9, the first swap comprising a first shift amount of a first one of the two consecutive translation ranges and a second shift amount of a second one of the two consecutive translation ranges, and
- the second swap comprising a third shift amount of a first one of the second two consecutive translation ranges and a fourth shift amount of a second one of the second two consecutive translation ranges.

12. A method according to claim 9, further comprising:
- determining a third version of the hierarchy of nodes;
- determining a second difference between the second version of the hierarchy of nodes and the third version of the hierarchy of nodes of the hierarchical data;
- determining a second swap of two consecutive translation ranges of the first interval encoding, the second swap representing the second difference.

* * * * *